United States Patent [19]
Nakayama

[11] Patent Number: 5,690,976
[45] Date of Patent: Nov. 25, 1997

[54] METHOD OF MANUFACTURING COLORED ICE AND APPARATUS THEREFOR

[75] Inventor: Junya Nakayama, Kawaguchi, Japan

[73] Assignee: Nakayama Engineering Co. Ltd., Kawaguchi, Japan

[21] Appl. No.: 543,642

[22] Filed: Oct. 16, 1995

[51] Int. Cl.⁶ ........................................... F25D 31/00
[52] U.S. Cl. ..................... 426/68; 62/59; 62/356; 426/515; 426/524
[58] Field of Search ............... 426/68, 515, 524; 62/59, 75, 356

[56] References Cited

U.S. PATENT DOCUMENTS 3,729,948  5/1973  Schwartz .................. 426/524

Primary Examiner—George Yeung
Attorney, Agent, or Firm—Susan M. M. Ben-Oliel

[57] ABSTRACT

A method of manufacturing colored ice comprises dissolving coloring agent in source liquid to form colored source liquid, placing the colored source liquid in a pressure resistant housing, said housing comprising a pressure regulating means and then while freezing the colored source liquid, using the pressure regulating means to vary levels of direct high and low pressure to the colored source liquid such that at high pressure level intervals, there is contact between the pressure regulating means and the surface of the colored source liquid.

13 Claims, 2 Drawing Sheets

METHOD OF MANUFACTURING COLORED ICE AND APPARATUS THEREFOR

FIELD OF THE INVENTION

This invention concerns a method of manufacturing colored ice formed by colored liquid.

BACKGROUND OF THE INVENTION

Currently, a variety of colored ice made by various methods is offered to consumers in an attempt to meet their needs for ice cubes for use in foods, drinks and desserts. For example, coloring agents have been added to the surface of clear ice to form flavored/perfumed ice, or used to form ice of specific shapes. In particular, ice cubes are widely used to chill soft drinks such as juice, or dilute them to lighten the sensation on palate. For that purpose, consumers prefer types of ice that provides not only cooling effect but also refreshing sensation as well. In serving frozen desserts, ice with a rich variety of colors which gives a crystal-like impression is most preferred.

There are some colored conventional ice cubes offered on the market. The colored ice cubes are highly popular not only because they can be used to chill drinks, but also because their rich and pleasant colors can create effective sensation of "ambiance". However, these conventional colored ice cubes are not made of coloring agents dissolved in the ice crystals. They simply consist of numerous tiny ice particles bound together. Because they are a mixture of tiny ice particles and coloring agent, they lack clarity. This happens because an ice crystal is a highly characteristic structure made of water particles bonded by hydrogenation, which makes it difficult for impurities to replace water particles inside crystal lattice, or for foreign elements to penetrate into gaps among crystal lattices. It is also partly due to the difficulty of suppressing the separation of coloring agent and ice crystals in the manufacturing process of colored ice. Water particles form columnar crystals when freezing and displace other particles, perhaps due to a large difference in each ingredient in terms of its freezing point and particle size. For this reason, it has been considered extremely difficult to develop colored ice cubes that posses superior clarity.

In the past, several methods and systems have been proposed for the production of colored ice cubes that claim to overcome the characteristic structure of ice crystals. One of them, described in Japanese Patent Disclosure No. Showa 62-56753 in the Japanese Patent Journal, adds a special stabilizer suitable for the production of colored ice cubes. The method then calls for an injection of steam to form de-aerated water which is then frozen. The second method, described in Japanese Patent Disclosure No. Showa 63-286677 in the Japanese Patent Journal, mixes pure water and drinking water to make up raw material. A coloring agent is mixed into this source water. The water is then poured into a tubular container and cooled in a still condition until frozen. The third method, described in Japanese Patent Disclosure No. Showa 63-286678 in the Japanese Patent Journal, teaches the injection of pure water and coloring agent into gaps in crushed clear ice cubes followed by freezing of the cubes. The fourth method, described in Japanese Patent Disclosure No. Heisei 3-95372 in the Japanese Patent Journal, calls for the injection of colored water into a pressure-resistant container and pressurization of the water and non-soluble pressurizing gas until the water freezes.

Closer examination of the above-mentioned methods and/or systems, however, reveals the following deficiencies and problems. The first method requires the development of a freezable and non-toxic stabilizer as an additive. It is also complicated by the requirement of pre-treatment such as the injection of steam and de-aeration. The second and third methods require pure water prepared in advance which would lead to increased production costs. Also, it would be cumbersome to prepare crushed clear ice as required in the third method because of the requisite clarity for the consumer market. The fourth method results in uneven coloring from time to time because the coloring agent is not uniformly distributed in the water during freezing under pressure. These conventional manufacturing methods and systems tend not only to be time-consuming but also costly due to the complexity of their methodologies. As well, it is difficult to produce uniform color distribution or to offer colored ice at lower prices.

There are some other known methods for preparing colored ice in addition to those disclosed above, for example, one method involves slowly developing ice crystals on a plate, however, these methods also require certain additional equipment, or pose complicated problems during manufacturing.

It is an object of the present invention to obviate or mitigate the above disadvantages.

SUMMARY OF THE INVENTION

The present invention provides a method of manufacturing colored ice which comprises dissolving coloring agent in source liquid to form colored source liquid, placing colored source liquid in a pressure-resistant housing, wherein said housing comprises a pressure regulating means, which separates a pressurizing agent from direct contact with the colored source liquid and during freezing of the colored source liquid, using the pressure regulating means to apply varying levels of direct high and low pressure to the colored source liquid such that at high pressure levels, there is contact between the pressure regulating means and the surface of the colored source liquid.

It is believed that applying, at intervals, varying levels of direct pressure to the surface of the colored source liquid has several effects. Firstly, at levels of high pressure where there is contact between the pressure regulating means and the surface of the colored liquid, any existing air between the pressure regulating means and the surface of the liquid is removed, thereby reducing the opportunity for contamination of the ice with unsightly pockets or bubbles. Secondly, by varying the pressure levels, the Brownian movement in the liquid is enhanced thereby promoting thorough mixing of the coloring agent and the liquid during the freezing process. Thirdly, at the intervals of low pressure the Brownian movement is reduced, thereby stabilizing the liquid.

One of the key aspects of the present invention is that the pressure regulating means acts as a barrier between the actual pressurizing agent, whether it be gas or oil or other material, and the colored source liquid. In other words, the pressurizing agent is not allowed to commingle with the colored source liquid but merely exerts pressure on the liquid via the pressure regulating means. This aspect of the present invention has overcome the difficulties encountered in Japanese Patent Disclosure 3-95372 ("Disclosure 3-95372"), discussed hereinabove. In Disclosure 3-95372, non-soluble gas such as nitrogen, argon or helium is allowed to fill the space above the surface of the liquid in the pressure-resistant housing. Gas is thereby utilized to equalize the pressures between the two different phases within the vessel during freezing. The problem inherent in the process of Disclosure 3-95372 is that even gases defined as non-soluble under normal gravity may become soluble under high pressure. When liquid with dissolved gas is frozen, the gas is dispelled through ice forming or distributed highly irregularly within the crystal lattice as tiny bubbles which results in low optic consistency of the ice.

In sharp contrast to Disclosure 3-95372, the method of the present invention does not contemplate contact between the pressurizing agent and the surface of the liquid. The only contact is between the pressure regulating means (fillable with pressuring agent) and the surface of the liquid.

In another aspect of the present invention an apparatus suitable for the manufacture of colored ice is provided which comprises pressure-resistant housing comprising a chamber for colored source liquid and a sealable lid, a pressure regulating means which is capable of varying the pressure level in the chamber without direct contact between a pressurizing agent and the liquid and which pressure regulating means is capable of directly contacting the surface of the liquid in the chamber, and a freezing means.

In order to address the problems existing in the above-mentioned conventional methods, the method and apparatus of the present invention were created to meet the existing needs of the market and the ice-making industry by offering a method and apparatus with which one can produce highly crystalline and uniformly colored ice using a simple process with relatively inexpensive equipment and at a low running cost.

DESCRIPTION OF THE DRAWINGS

The present invention is described with reference to the following non-limiting drawings wherein.

PREFERRED EMBODIMENTS OF THE INVENTION

In a preferred form of the present invention, the pressure regulating means comprises an inflatable resilient pouch situated within the housing, although other types of linings or sacks are considered within the scope of the present invention. The pouch may be made of any suitably flexible material provided it has the resiliency necessary for accomodating the varying levels of pressure which will be applied at intervals during the freezing process and provided it is non-porous i.e. it has the "barrier" qualities necessary to separate the pressurizing agent from the liquid. In a most preferred form, the pouch is made of a synthetic rubber material such as nitryl, silicone or fluorine.

The pressure regulating means may be situated at any place within the pressure-resistant housing, although in a preferred form, it is situated within the lid of the housing. This way, an additional sealing feature is provided. In a most preferred form of the present invention, the lid of the housing has a place and snap lid which, when combined with the pouch, provides a simple and efficient closing and sealing arrangement. This is in contrast to other housing, such as that disclosed in Disclosure 3-95372, in which screw bolts are used for sealing the lid and in which a large torque is required for proper sealing.

Figure 1:
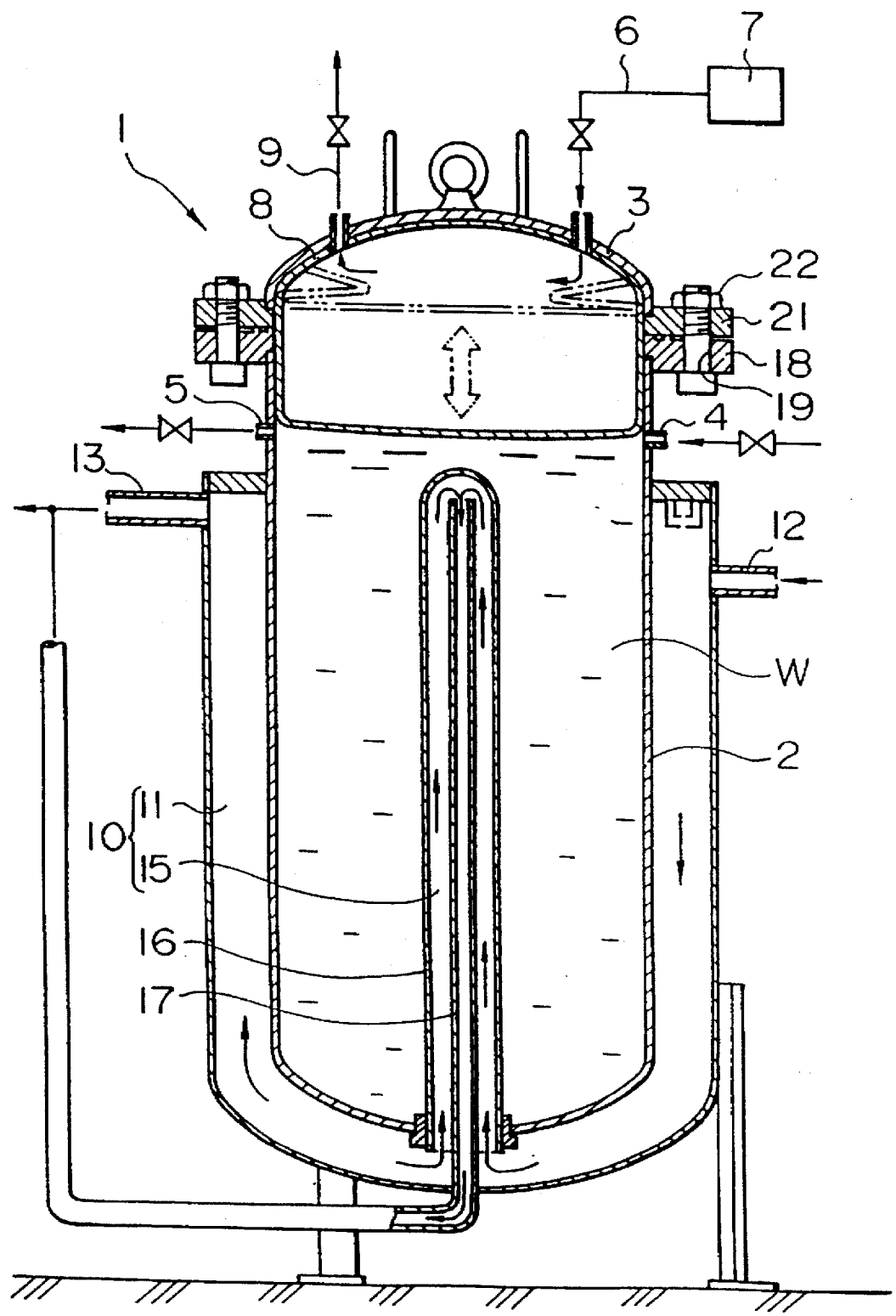
FIG. 1 represents a side view in cross section of the apparatus of the present invention.

With reference to FIG. 1, one aspect of the present invention features a method of manufacturing colored ice in which alternately varied levels of pressure are applied repeatedly to colored "Source Water W" injected to fill a pressure-resistant "Ice-maker 1" by the use of an inflatable hollow and elastic pressurize regulating means or pouch ("Pressurizer 8") installed in the Ice-maker 1, and at the same time, the Ice-maker 1 is cooled to freeze the Source Water W into ice.

In a preferred form of the method of this invention, a coloring agent is dissolved into the Source Water W. As the Source Water W is injected into the Ice-maker 1, the Pressurizer 8 which is inflated inside the Ice-maker 1 comes into contact with the surface of the Source Water W. This expels air trapped between the surface of the Source Water W and the Pressurizer 8 and removes the air from the Ice-maker 1.

With a forced supply of pressurizing agent into the Pressurizer 8 which is in contact with the surface of the Source Water W inside the Ice-maker 1, the Pressurizer 8 inflates and applies required levels of high pressure directly to the Source Water W. The repeated application of pressure of the Source Water W, with alternating low and high pressures supplied to the Pressurizer 8, amplifies Brownian movement occurring to the water and coloring agent particles inside ice crystals as the Source Water W freezes, and promotes thorough mixing of these particles. Conversely, when the pressure is eased, the Brownian movement is reduced and the mixture is stabilized. It appears that alternate variation of pressure makes the coloring agent particles existing on the boundary surfaces of ice crystals penetrate into the inside of these crystals before freezing. The freezing induces an equilibrium in the mixture and further promotes thorough blending of the two materials when frozen.

The inflation of the Pressurizer 8 also closes any gap between the Source Water W and the Tank 2 in the Ice-maker 1, isolates the inside of the Tank 2 from the outside environment, and prevents leakage when the varied pressures are applied.

An example of the operation of this invention is described, using the diagrams attached. The item numbered 1 in the diagram represents a pressure-resistant Ice-maker. As an example, it consists of a Tank 2 which opens at the top, and a Lid 3, which seals the opening of the Tank 2. The colored Source Water W is poured into the Tank 2 through a "Water Supply Port 4", located near the top of the Tank 2, and flowed out of an "Overflow Port 5", also located near the top of the Tank 2. Both the Water Supply Port 4 and the Overflow Port 5 are placed at the same elevation so as to let only excess Source Water W flow out the Overflow Port 5 without trapping any residual air in the Tank 2 in case the bottom of the inflated Pressurizer 8 happens to set a surface level of the force-fed Source Water W. This ensures that only the Source Water W remains in the Tank 2. When the Tank 2 is full, these openings are shut off by valves.

The coloring agents that may be used in the method of the present invention include, but are not limited to, non-toxic food additives such as blue tar pigment, benibana red tar pigment, yellow tar pigment and caramel. The agent(s) of choice is dissolved in the Source Water W at any ratio appropriate to achieve desired color. As for a colored Source Water W, widely marketed beverages such as colas, pops, tea, oolong tea, coffee, or fruit drinks may be used. Pure water may also be used as the Source Water W. The use of the pure water will ensure that coloring agent is securely sealed inside ice crystal lattice when the water freezes.

In a preferred form of operation, the Pressurizer 8 is installed inside the Ice-maker 1, between the Lid 3 and the Source Water W. It is inflated by a pressurizing agent such as compressed air or brine, which is supplied by the "Pressure Pump 7" through the "Pressure Supply Pipe 6" which is fitted, for example, through the Lid 3, and discharged through the "Discharge Pipe 9". The inflation is set to occur downward in the Tank 2. The pressure is applied to the Pressurizer 8 by opening and closing of valves attached to the Pressure Supply Pipe 6 and the Discharge Pipe 9. The pressure range inside the Pressurizer 3 is set, for instance, between 1 Mpa and 5 Mpa, more preferably between 1 Mpa and 1.5 Mpa and alternated at an interval of 20 to 30 seconds, most preferably at an interval of 23 seconds for five to six hours duration. The Pressurizer 8 is designed so that its bottom reaches the surface of the Source Water W inside the Tank 2 at a critical level when inflated, that is, the level of the above-mentioned Water Supply Port 4. It also acts as a seal to shut off any gap created between the opening of the Tank 2 and outside rim of the Lid 3.

As discussed above, the Pressurizer 8 may be made of a synthetic rubber material, such as chloroprene (CR), nitryl (NBR), silicone (SI) or fluorine (FRM), for weather-resistant, mechanically strong, inflatable and flexible properties. When inflated, the outer surface of the Pressurizer 8 is pressed against the interior of the Tank 2 and the Lid 3, filling and blocking any gap between them. Also, the Pressurizer 8 is installed inside the Lid 3, and, combined with repulsion created against the internal pressure of the Ice-maker 1 when the Lid 3 is secured onto the Tank 2, it also presents the inflation capacity toward the outside of the Ice-maker 1. This inflation places the Pressurizer 8 closely against the inside rim of the opening of the Tank 2, and also presses the Pressurizer 8 tightly against the interior surfaces of the Tank 2 and Lid 3, filling the gap between them. When deflated, the Pressurizer 8 is reduced to a compact form with its outer wall collapsed in a bellow-like fashion or simply flattened out.

The Pressurizer 8 can be inflated to achieve desired internal pressure in advance before the installation, or alternately, fitted with an external pressure supply system so that the internal pressure of the Pressurizer 8 can be adjusted accordingly to the internal pressure of the Ice-maker 1 when it is installed in it. It is to be understood that the installation of the Pressurizer 8 is not limited to the upper part of the Ice-maker 1. It can be installed either in the bottom or on the interior wall of the Tank 2, as long as the Pressurizer 8 is able to apply a direct pressure to the Source Water W inside the Ice-maker 1 with the supply of a pressurizing agent.

FIG. 1 shows an example of the installation of the Pressurizer 8, in which the Pressurizer 8 presents almost a disc-like form covering nearly entire surface of the underside of the Lid 3 secured onto the high-pressurized Ice-maker 1. Pressurizer 8 may also be installed so as to look like a flat doughnut closely placed against the underside of the Lid 3 secured onto the opening of the Tank 2, or on the interior wall of the Tank 2, or located on the interior wall closer to the bottom of the Tank 2. Furthermore, a plate made of rigid material may be attached to the Pressurizer 8, locating it on the surface next to the Source Water W, which will prevent variances in the shape by regulating all or part of the pressurizing surface into forming smooth surface.

The freezing means contemplated within the scope of the present invention may be any suitable means known within the art. For example, Ice-maker 1 may be equipped with a "Cooling Device 10" so that the Source Water in it will be frozen simultaneously from outside and the core. In this arrangement, the Cooling Device 10 consists of a "Brine Container 11" which forms a sheath around the exterior wall and bottom of the Tank 2, and a "Brine Core 15" which runs through approximately the center of the Tank 2, and is connected to the Brine Container 11 by passing through either the bottom of the Tank 2 or the Lid 3.

The Brine Container 11 is formed around the exterior of the Tank 2 so that the Tank 2 is wrapped in brine to cool the interior of the Ice-maker 1. It is equipped with a "Brine Supply Port 12", through which the brine formed in the Cooling Device 10 is supplied at a certain rate, and a "Brine Discharge Port 13", through which the brine is returned to the Cooling Device 10. The Brine Core 15, which runs through near center of the Tank 2, is connected to the Brine Container 11, after passing through either the bottom of the Tank 2 or the Lid 3. The Brine Core 15 acts as a path for the brine flowed in from the Brine Container 11, which is supplied by the Cooling Device 10. The brine in the Brine Core 15 cools the inside of the Ice-maker 1, and is drained to the Discharge Port 13 located on the Brine Container 11.

The Brine Core 15 represents a passage for the brine diverted from the Brine Container 11. FIG. 1 shows a pipe-inside-pipe design that consists of a vertical closed-end "Outside Pipe 16" which is connected to the Brine Container 11 through the bottom of the Tank 2, and an "Inside Pipe 17" which opens at near the ceiling of the "Outside Pipe 16", and is connected to the Brine Discharge Port 13, after passing through the Brine Container 11. The brine is introduced to the Brine Core 15 at the center of the Tank 2 from the Brine Container 11 located outside of the Tank 2 through the Outside Pipe 16 and drained through the Inside Pipe 17 to the Brine Discharge Port 13.

Figure 2:
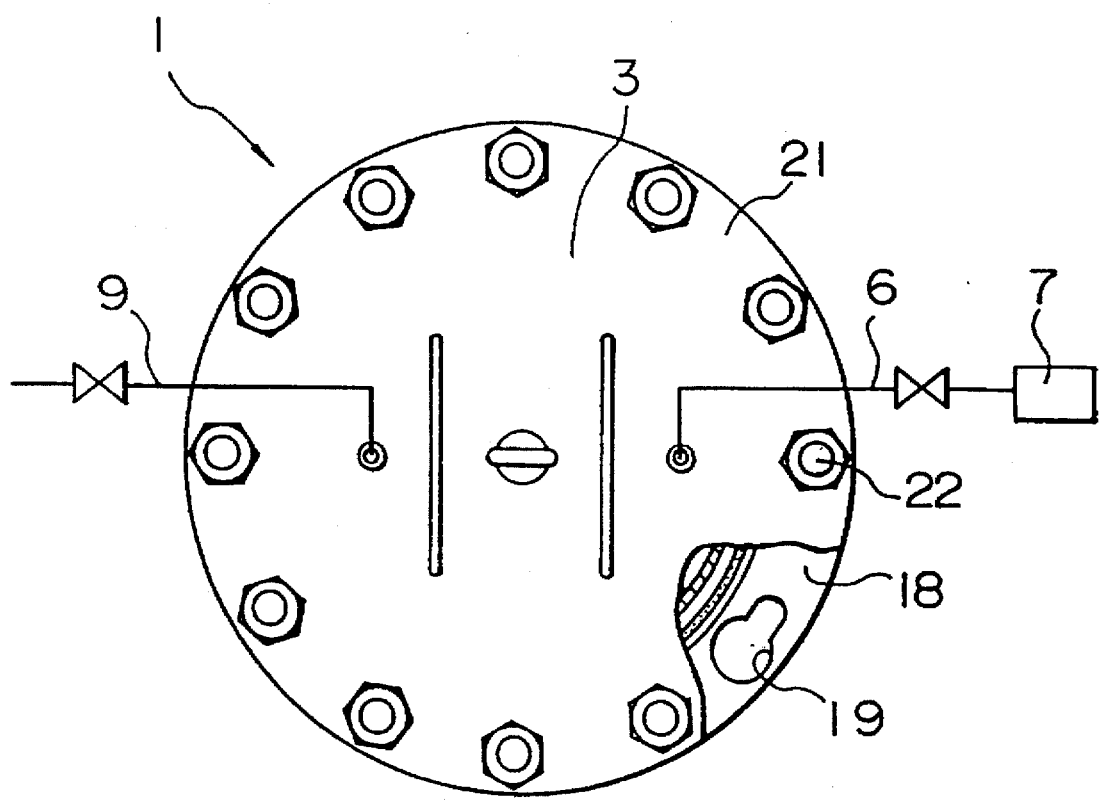
FIG. 2 represents a top view of the apparatus of FIG. 1 with a partial cut-away exposing a locking hole.

As shown in FIG. 2, and in a preferred aspect of the present invention, the flange on the rim of the opening of the Tank 2 has a keyhole-shape "Locking Hole 19". A bolt with a nut ("Bolt 22") is inserted through the flange on the lid ("Flange 21") on the outside rim of the Lid 3. When the Lid 3 is placed on the Tank 2, the Bolt 22 is inserted into the wide end of the Locking Hole 19. The Bolt 22 then slides into the narrow end of the Locking Hole 19 at a slight turn of the Lid 3. As a result, the Tank 2 and the Lid 3 of the Ice-maker 1 are secured together by a simple operation of locking the "Bolt 22" into its position.

In operation, the preferred method of the present invention is as follows. Carbonated water is prepared, if necessary, to enhance taste. The Tank 2 is filled with a sufficient quantity of the Source Water W, in which coloring agent made of appropriate syrups and other similar material is dissolved and thoroughly mixed. After the filling is completed, the Lid 3 is fitted and secured on to the Tank 2. A certain pressurizing agent is supplied by a pressure pump through the Pressure Supply Pipe 6 to the Pressurizer 8 to inflate it temporarily. In the meantime, the Source Water W is injected into the Ice-maker 1 through the Water Supply Port 4 to fill up the tank completely until the water leaks out of the Drain Port 5 in order to ensure all the air inside is removed. Then the Pressurizer 8 is inflated by forced injection of compressed air or other agent. The pressure level should be varied, for example, within a range of 1 MPa and 1.5 Mpa by alternately closing and opening the valves located at the Pressure Supply Pipe 6 and Discharge Pipe 9 at a rate of 23 second interval for five to six hours' duration. At the time, the brine is supplied to the Brine Container 11, and to the Brine Core 15 to cool the entire Ice-maker 1 to freeze the Source Water W. The freezing precipitates solid hydrates ($CO_2 8H_2O$). The cooling capacity fo of the Cooling Device 10 should be increased by 30%, as thermal movement generated by the repeated pressurization/depressurization increases freezing load.

when freezing is completed, the pressure inside the Pressurizer 8 is released through the Discharge Pipe 9. Then the Pressurizer 8 is filled with compressed air heated to about 30° C., which is then exhausted, in order to melt the Source Water W frozen onto the contact surface of the Pressurizer 8 before removing the Lid 3. At the same time, the brine with a controlled temperature range of 0° C. to 5° C. is sent into the Brine Container 11 to melt the surface of the ice frozen onto the Tank 2 to facilitate the removal of ice product. Open the Lid 3 to remove the ice product from the Tank 2.

The pressure applied to the Source Water W by the Pressurizer 8 can be increased up to about 1 GPa, depending on the pressure-resistant capacity of the Ice-maker 1, the selection of fluid such as oil as pressurizing agent, the material of Pressurizer 8 itself, and the thickness of its pouch membrane, etc. However, if this is to be done, the pressurizing agent must be expelled for the Pressurizer 8 strictly according to the rate at which the forming ice expands in order to prevent damage to the Ice-maker 1.

The use of a cola solution, that is a solution containing caramel coloring, aspartame, L-phenylalamine compound, acid, flavoring and preservative (sodium benzoate), as the Source Water W in the Ice-maker 1 produced 170 kg of ice, which was a carbonated ice with its ingredients evenly distributed throughout to produce a uniform color and flavor.

This invention, as described above, enables the production of crystalline and hard colored ice, by a simple method of filling the Ice-maker 1 with colored Source Water W, and applying varied pressures to the Source Water W by Pressurizer 8. Furthermore, this method makes it possible to produce ice with colors of any desired intensity, at low running cost with relatively inexpensive equipment.

By a forced supply of pressurizing agent into the Pressurizer 8 to inflate it against the surface of the Source Water W, the Source Water W in the Ice-maker 1 is placed under a direct high pressure. Under this condition, the entire Source Water W freezes to produce a colored ice mass. Furthermore, by varying the pressure applied to the Pressurizer 8 repeatedly helps coloring agent on the border surface of ice penetrate inside ice crystals during freezing of the Source Water W to produce a crystalline and uniformly colored ice mass. Also, the ice produced in this method will not contain any air bubbles which tend to reduce the clarity. In addition, the ice mass is superior in hardness as it is not produced from crushed ice or ice flakes.

The ice is uniformly colored because coloring agent is distributed evenly and sealed inside the ice as a result of compressing the Source Water W under high pressure. In particular with this method, it is possible to suppress the process of characteristic ice formation (hydrogenation) and have impurities replace water particles in crystal lattice or penetrate into crevices in it. As a result, the separation of the impurities and ice crystals inside crystal lattice is suppressed. The resulting product will present uniform distribution of color, giving much the same impression of color dissolved in water, without clouding or spotting.

Installed inside the Ice-maker 1 is a hollow, elastic Pressurizer 8 which is inflated by the supply of pressurizing agent. The inflated pouch comes into contact with the surface of the Source Water W injected through the Water Supply Port 4, and expels air trapped between the surface of the Source Water W and the Pressurizer 8. The air is removed from the Ice-maker 1 through the Drain Port 5, allowing the Pressurizer 8 to directly press against the Source Water W. Furthermore, as the Ice-maker 1 is sufficiently filled with the Source Water W injected through the Water Supply Port 4, the excess water will leak out of the Drain Port 5, allowing operator to ensure that there is no air remaining inside the Ice-maker 1.

In addition, because the Pressurizer 8 is placed between the Source Water W inside the Tank 2 and the Lid 3, the inflation of the Pressurizer 8 acts as a seal to shut off any gap between them, as well as to isolate the interior of the Ice-maker 1 from the external environment. This allows for the simplification of the structure as a whole. Also, the inflation of the Pressurizer 8 is designed to prevent formation of uneven surface at the pressure point, thus smoothing out the surface in contact with the Source Water W and ensuring a uniform application of pressure to the surface of the Source Water W. Furthermore, the Pressurizer 8 also acts as a buffer while the Source Water W expands during its freezing process, which prevents possible damage to the Ice-maker 1.

I claim:

1. A method of manufacturing colored ice which comprises:

dissolving coloring agent in source liquid to form colored source liquid;

placing colored source liquid in a pressure resistant housing, said housing comprising an inflatable, resilient pouch which separates a pressurizing agent from direct contact with the colored source liquid; and during freezing of the colored source liquid, injecting the pressurizing agent into said pouch and varying the level of high and low pressure on the colored source liquid, such that at levels of high pressure, there is contact between said pouch and the surface of the colored liquid.

2. The method of claim 1 wherein the inflatable resilient pouch is associated with a lid of the housing.

3. The method of claim 1 wherein the pouch is made of synthetic rubber selected from the group consisting of chloroprene, nitryl, silicone and fluorine.

4. The method of claim 1 wherein the source liquid is selected from the group consisting of water, colas, pops, tea, oolong tea, coffee and fruit drinks.

5. The method of claim 1 wherein the coloring agent is selected from the group consisting of blue tar pigment, benibana red tar pigment, yellow tar pigment and caramel.

6. The method of claim 1 wherein the pressure is varied between 1 Mpa and 5 Mpa during the freezing of the source liquid.

7. The method of claim 1 wherein the pressure is varied between 1 Mpa and 1.5 Mpa during the freezing of the source liquid.

8. The method of claim 1 wherein the pressure is varied between 2 Mpa and 5 Mpa during freezing of the source liquid.

9. The method of claim 1 wherein the pressurizing agent is selected from the group consisting of compressed air, other compressed gases, and oils.

10. An apparatus for the manufacture of colored ice which comprises:

a pressure-resistant housing comprising a chamber for colored source liquid and a sealable lid;

an inflatable, resilient pouch which is capable of:
        separating a pressurizing agent from the source liquid when the liquid is in place;
        varying the pressure level in the chamber between high and low levels; and
        directly contacting the surface of the liquid when the liquid is in the chamber;

a means for injecting pressurizing agent into said pouch; and a freezing means.

11. The apparatus of claim 10 wherein the pouch is in association with the lid of the housing.

12. The apparatus of claim 10 wherein the pouch is made of a synthetic rubber selected from the group consisting of chloroprene, nitryl, silicone and fluorine.

13. The apparatus of claim 10 wherein the pouch additionally comprises a rigid plate for use in contacting the surface of the liquid.

* * * * *